US012381683B2

(12) United States Patent
Sun et al.

(10) Patent No.: US 12,381,683 B2
(45) Date of Patent: Aug. 5, 2025

(54) 5G NR ENHANCEMENTS FOR FD-OCC LENGTH TO SUPPORT DMRS PORT CONFIGURATIONS

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Hong He, San Jose, CA (US); Huaning Niu, San Jose, CA (US); Seyed Ali Akbar Fakoorian, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 17/934,627

(22) Filed: Sep. 23, 2022

(65) Prior Publication Data

US 2024/0106599 A1    Mar. 28, 2024

(51) Int. Cl.
*H04L 5/00* (2006.01)
*H04J 13/00* (2011.01)

(52) U.S. Cl.
CPC .......... *H04L 5/0051* (2013.01); *H04J 13/004* (2013.01); *H04L 5/0007* (2013.01)

(58) Field of Classification Search
CPC ........... H04L 27/2613; H04L 27/26035; H04L 5/0051; H04L 5/0094; H04L 1/08; H04L 5/14; H04L 5/0044; H04L 5/0048; H04W 72/0446; H04W 72/115; H04W 72/1268; H04W 72/23
See application file for complete search history.

(56) References Cited

U.S. PATENT DOCUMENTS

| | | | |
|---|---|---|---|
| 11,902,069 B2* | 2/2024 | Matsumura | H04L 27/261 |
| 11,996,967 B2* | 5/2024 | Sengupta | H04J 13/004 |
| 12,155,491 B2* | 11/2024 | Yi | H04L 1/1893 |
| 2020/0127786 A1* | 4/2020 | Kwak | H04B 7/0417 |
| 2021/0105117 A1* | 4/2021 | Abdelghaffar | H04L 27/2613 |
| 2022/0224456 A1* | 7/2022 | Yi | H04W 72/1268 |
| 2022/0224484 A1* | 7/2022 | Yi | H04L 5/0051 |
| 2022/0278880 A1* | 9/2022 | Matsumura | H04J 13/004 |
| 2022/0279360 A1* | 9/2022 | Matsumura | H04L 5/0017 |
| 2022/0303988 A1* | 9/2022 | Yi | H04L 1/08 |
| 2022/0322394 A1* | 10/2022 | Yi | H04L 1/08 |
| 2022/0377778 A1* | 11/2022 | Yi | H04L 5/0064 |
| 2023/0048695 A1* | 2/2023 | Kim | H04L 1/189 |
| 2023/0353315 A1* | 11/2023 | Abdelghaffar | H04L 27/2613 |
| 2023/0354163 A1* | 11/2023 | Yi | H04W 48/12 |
| 2024/0056203 A1* | 2/2024 | Yi | H04L 5/0048 |

(Continued)

*Primary Examiner* — Jung Liu
(74) *Attorney, Agent, or Firm* — Fay Kaplun & Marcin, LLP

(57) ABSTRACT

A user equipment (UE) configured to establish a connection to a fifth generation (5G) new radio (NR) network, wherein the connection is configured to utilize cyclic prefix (CP)—orthogonal frequency division multiplexing (OFDM) waveform and demodulation reference signal (DMRS) type 1, receive a DMRS port indication configured to indicate one or more DMRS ports assigned to the UE, wherein single symbol DMRS type 1 is configured to support up to 8 DMRS ports and two symbol DMRS type 1 is configured to support up to 16 DMRS ports and perform a transmission operation or a reception operation using the one or more DMRS ports assigned to the UE.

21 Claims, 12 Drawing Sheets

(56) References Cited

U.S. PATENT DOCUMENTS

| | | | |
|---|---|---|---|
| 2024/0072969 A1* | 2/2024 | Kwak | H04L 5/0051 |
| 2024/0284418 A1* | 8/2024 | Yi | H04L 5/0094 |
| 2024/0340864 A1* | 10/2024 | Yi | H04W 52/146 |

* cited by examiner

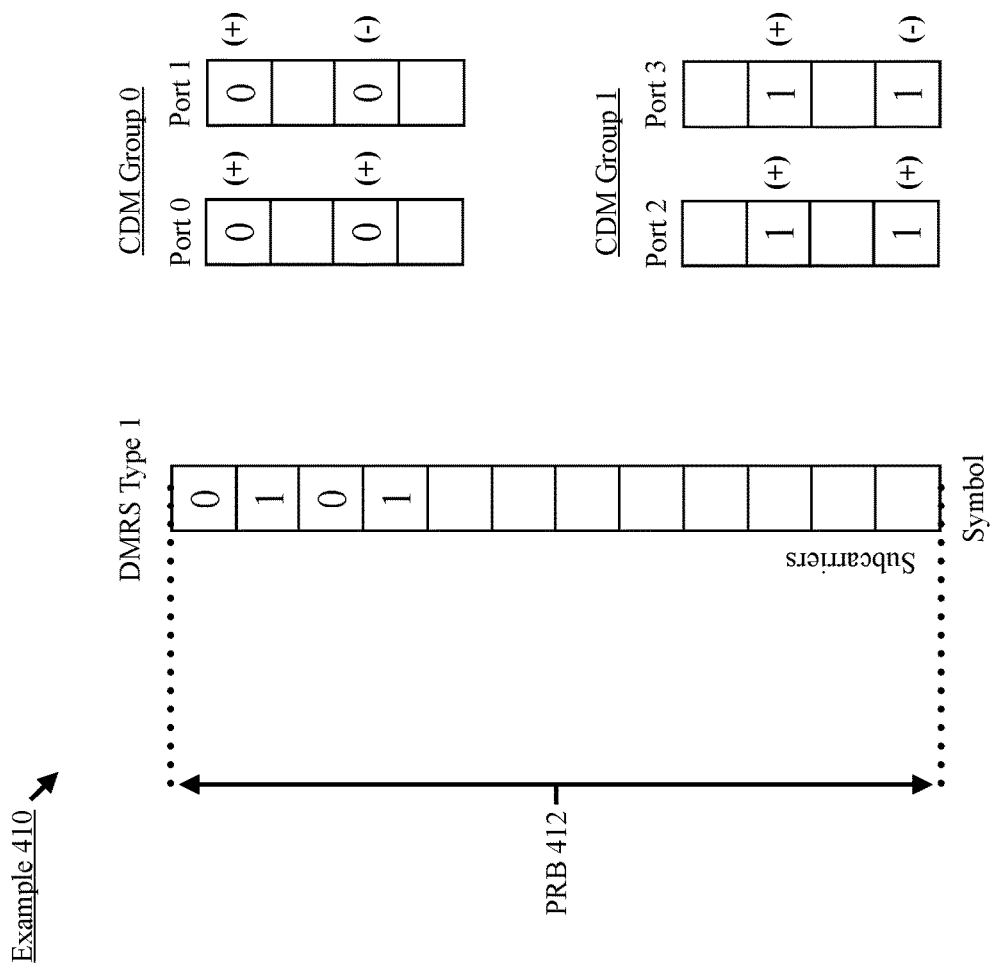

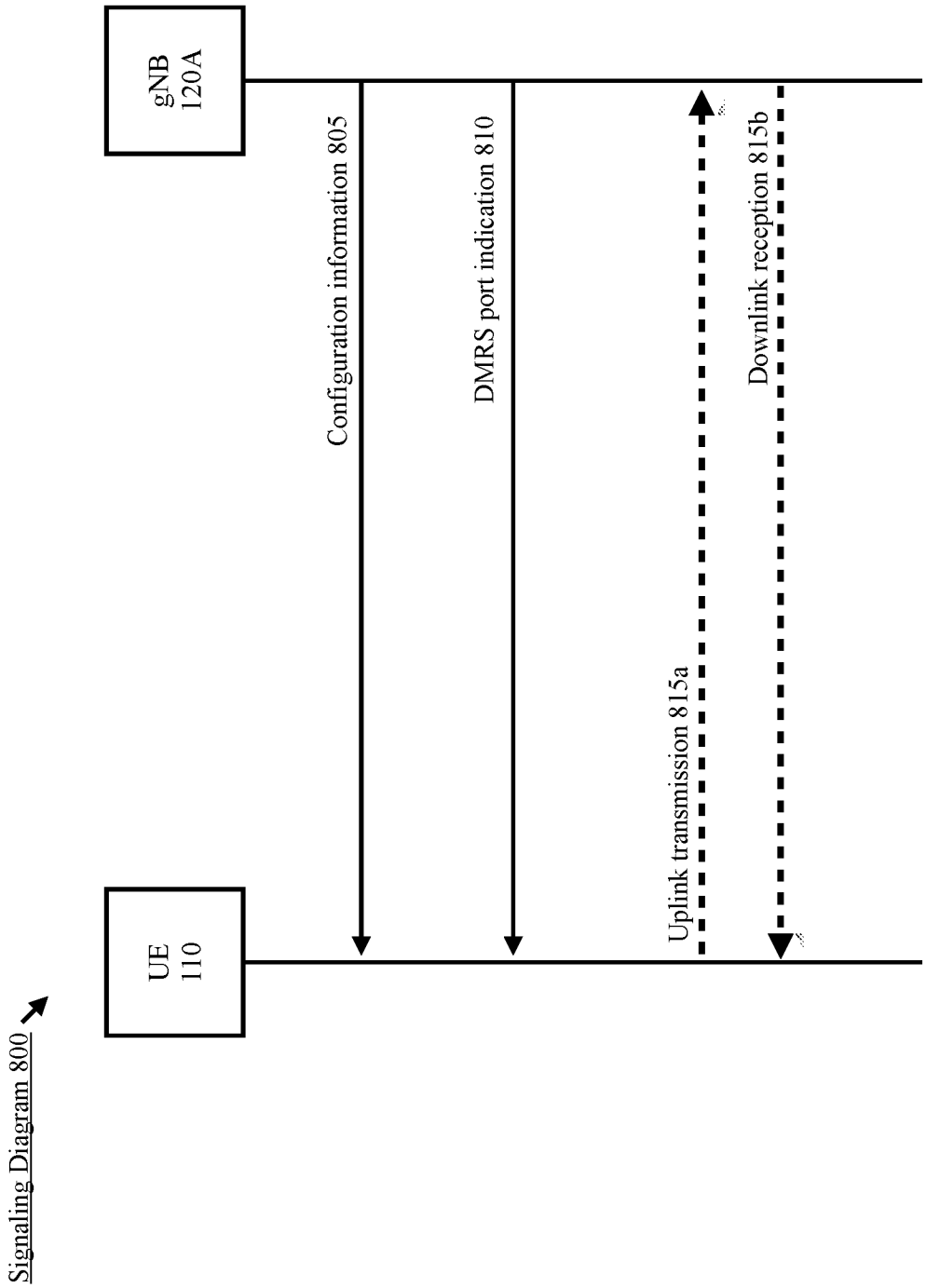

5G NR ENHANCEMENTS FOR FD-OCC LENGTH TO SUPPORT DMRS PORT CONFIGURATIONS

BACKGROUND

A fifth generation (5G) new radio (NR) network may utilize cyclic prefix—orthogonal frequency division multiplexing (CP-OFDM) waveform for uplink and/or downlink communications. In 5G NR, under conventional circumstances, the network may support up to 8 or 12 demodulation reference signal (DMRS) ports for CP-OFDM depending on the DMRS configuration type, e.g., DMRS type 1 or DMRS type 2. It has been identified that there exists a need to increase the number of supported DMRS ports for CP-OFDM.

SUMMARY

Some exemplary embodiments are related to a processor of a user equipment (UE) configured to establish a connection to a fifth generation (5G) new radio (NR) network, wherein the connection is configured to utilize cyclic prefix (CP)—orthogonal frequency division multiplexing (OFDM) waveform and demodulation reference signal (DMRS) type 1, receive a DMRS port indication configured to indicate one or more DMRS ports assigned to the UE, wherein single symbol DMRS type 1 is configured to support up to 8 DMRS ports and two symbol DMRS type 1 is configured to support up to 16 DMRS ports and perform a transmission operation or a reception operation using the one or more DMRS ports assigned to the UE.

Other exemplary embodiments are related to a user equipment (UE) having a transceiver configured to communicate with a fifth generation (5G) new radio (NR) network and a processor communicatively coupled to the transceiver and configured to establish a connection to the fifth generation (5G) new radio (NR) network, wherein the connection is configured to utilize cyclic prefix (CP)—orthogonal frequency division multiplexing (OFDM) waveform and demodulation reference signal (DMRS) type 1, receive a DMRS port indication configured to indicate one or more DMRS ports assigned to the UE, wherein single symbol DMRS type 1 is configured to support up to 8 DMRS ports and two symbol DMRS type 1 is configured to support up to 16 DMRS ports and perform a transmission operation or a reception operation using the one or more DMRS ports assigned to the UE.

Still further exemplary embodiments relate to a processor of a user equipment (UE) configured to establish a connection to a fifth generation (5G) new radio (NR) network, wherein the connection is configured to utilize cyclic prefix (CP)—orthogonal frequency division multiplexing (OFDM) waveform and demodulation reference signal (DMRS) type 2, receive a DMRS port indication configured to indicate one or more DMRS ports assigned to the UE, wherein single symbol DMRS type 2 is configured to support up to 12 DMRS ports and two symbol DMRS type 2 is configured to support up to 24 DMRS ports and perform a transmission operation or a reception operation using the one or more DMRS ports assigned to the UE.

Additional exemplary embodiments are related to a user equipment (UE) having a transceiver configured to communicate with a fifth generation (5G) new radio (NR) network and a processor communicatively coupled to the transceiver and configured to establish a connection to a fifth generation (5G) new radio (NR) network, wherein the connection is configured to utilize cyclic prefix (CP)—orthogonal frequency division multiplexing (OFDM) waveform and demodulation reference signal (DMRS) type 2, receive a DMRS port indication configured to indicate one or more DMRS ports assigned to the UE, wherein single symbol DMRS type 2 is configured to support up to 12 DMRS ports and two symbol DMRS type 2 is configured to support up to 24 DMRS ports and perform a transmission operation or a reception operation using the one or more DMRS ports assigned to the UE.

BRIEF DESCRIPTION OF THE DRAWINGS

FIGS. 4a-4d show examples of code division multiplex (CDM) groups for different demodulation reference signal (DMRS) configuration types and different DMRS symbol durations.

FIG. 8 shows a signaling diagram for providing the UE with configuration information for CP-OFDM and DMRS ports according to various exemplary embodiments.

DETAILED DESCRIPTION

Figure 1:
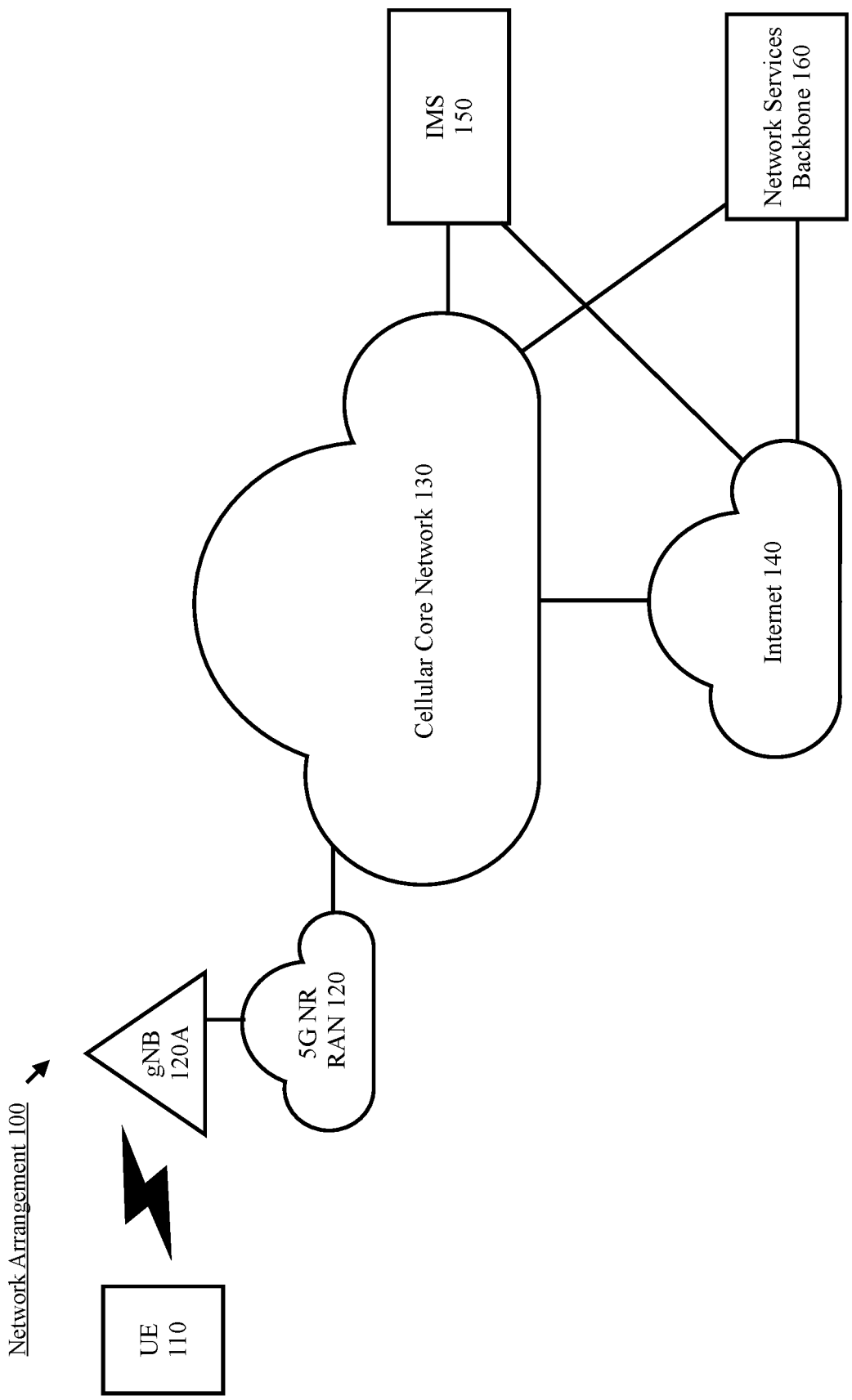
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to demodulation reference signal (DMRS) ports for cyclic prefix-orthogonal frequency division multiplexing (CP-OFDM) waveform.

The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a fifth generation (5G) New Radio (NR) network. However, reference to a 5G NR network is merely provided for illustrative purposes. The exemplary embodiments may be utilized with any network that utilizes CP-OFDM waveform in the uplink and/or downlink.

The exemplary embodiments are described with regard to DMRS for CP-OFDM waveform. Those skilled in the art will understand that DMRS is a reference signal that may be used for channel estimation. CP-OFDM may utilize DMRS to enable multiple layer transmissions where each layer corresponds to a different antenna port, e.g., DBMS port. Under conventional circumstances, DMRS type 1 may support up to four DMRS ports for single symbol DMRS and up to eight DMRS ports for two symbol DMRS. DMRS type 2 may support up to six DMRS ports for single symbol DMRS and up to twelve DMRS ports for two symbol DMRS. The exemplary embodiments described herein introduce techniques for increasing the number of supported DMRS ports for CP-OFDM.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., a sixth generation (6G) RAN, 5G cloud RAN, a next generation RAN (NG-RAN), a long term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, base stations or access nodes (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific base station, e.g., the gNB 120A.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
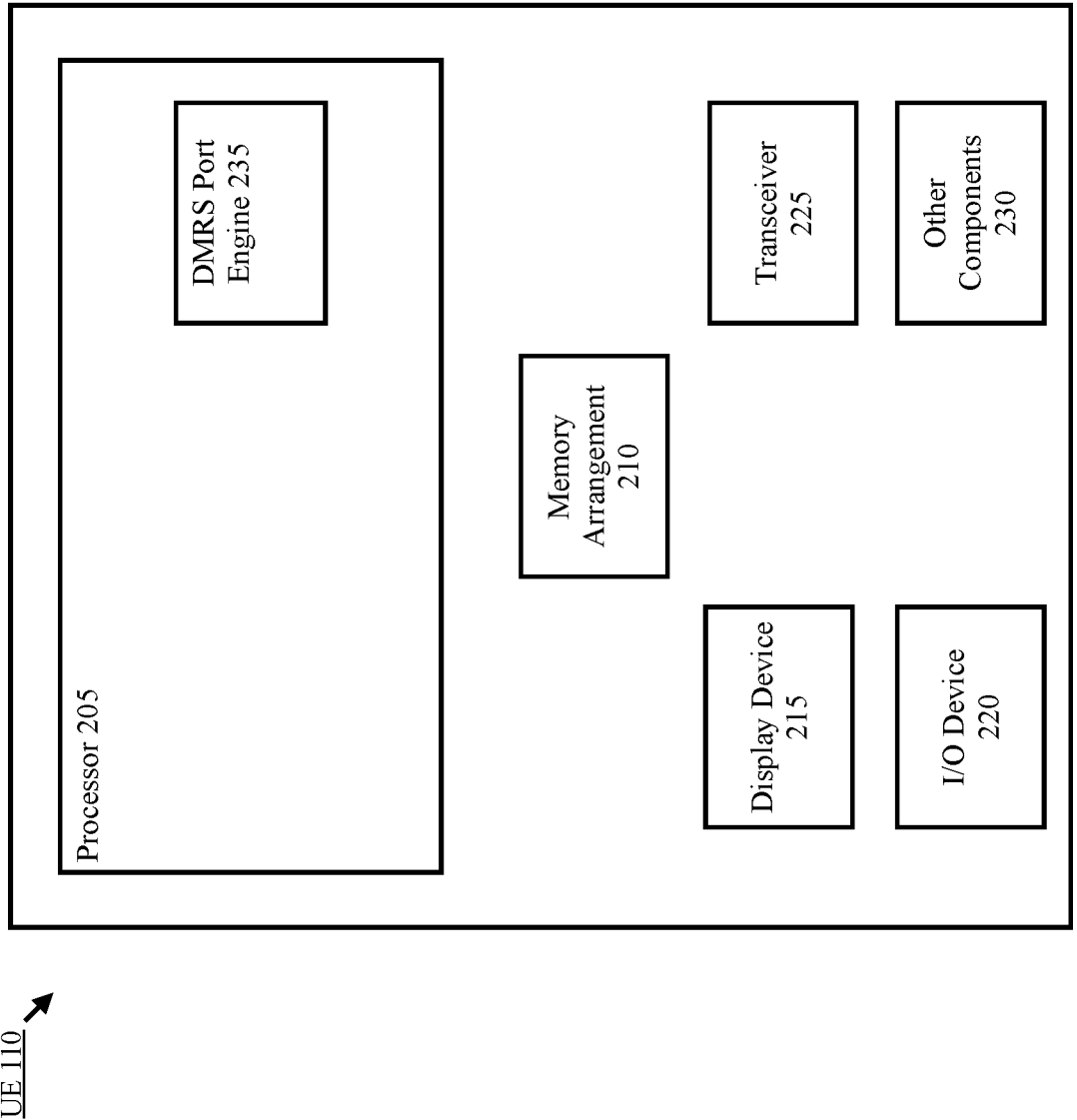
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a DMRS port engine 235. The DMRS port engine 235 may perform various operations related to DMRS for CP-OFDM. The operations may include, but not are limited to, receiving configuration information for DMRS, receiving an indication identifying which DMRS ports are allocated to the REs assigned to the UE 110, receiving the DMRS using the configured DMRS port and transmitting DMRS using the configured DMRS port.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
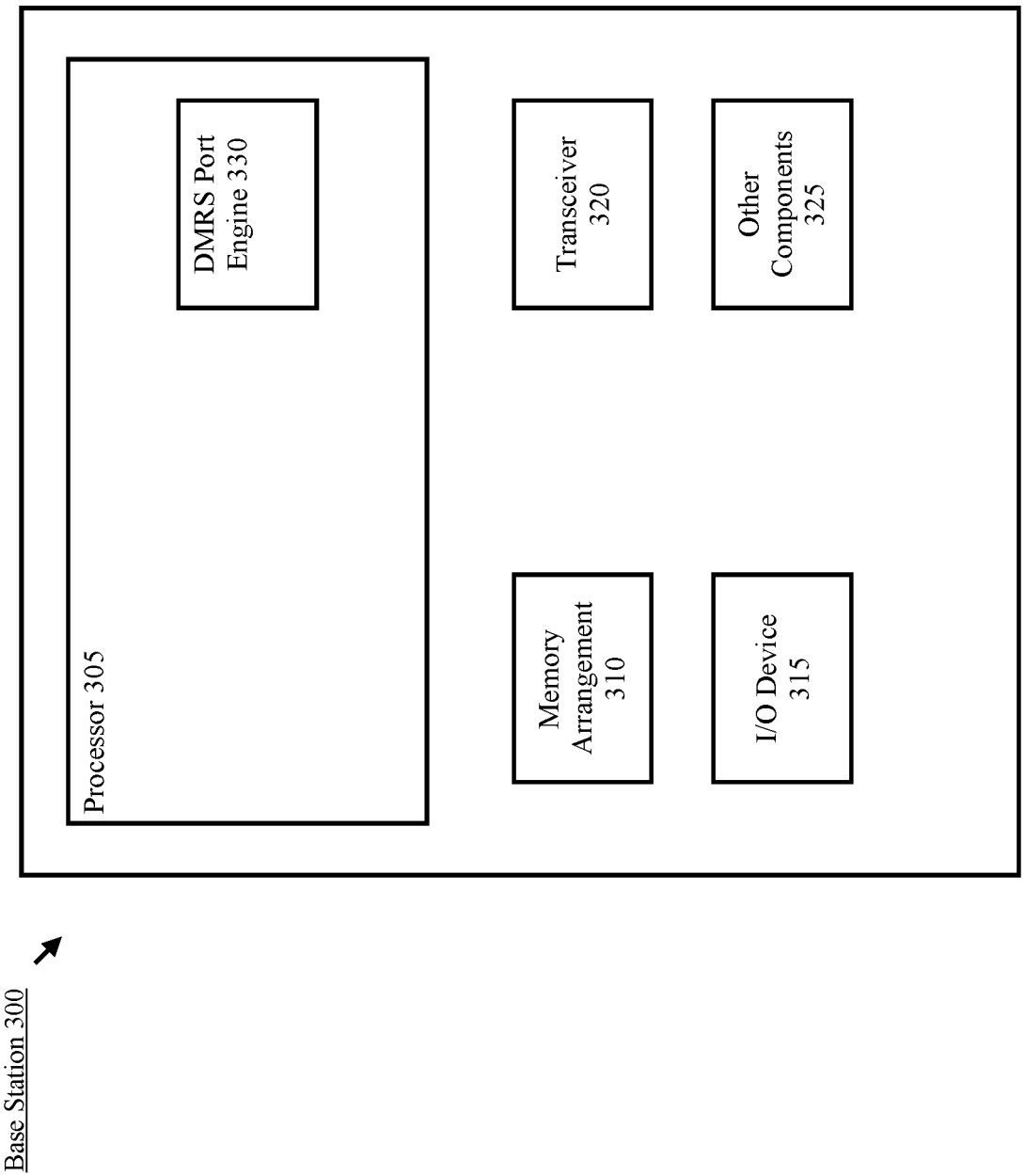
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320 and other components 325. The other components 325 may include, for example, an audio input device, an audio output device, a battery, a data acquisition device, ports to electrically connect the base station 300 to other electronic devices and/or power sources, etc.

The processor 305 may be configured to execute a plurality of engines for the base station 300. For example, the engines may include a DMRS port engine 330. The DMRS port engine 330 may perform various operations related to DMRS for CP-OFDM. The operations may include, but are not limited to, transmitting DMRS configuration information to one or more UEs, allocating DMRS ports to one or more UEs (e.g., single user-multiple input multiple output (SU-MIMO), multi-user MIMO (MU-MIMO), etc.), transmitting an indication to each UE identifying which DMRS ports have been allocated to REs assigned to the UE, transmitting DMRS to one or more UEs and receiving DMRS from one or more UEs.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

In the various examples described herein, reference is made to 5G NR physical resources arranged in a resource grid comprising subcarriers in the frequency domain and OFDM symbols in the time domain. Each element in a resource grid may be referred to as a resource element (RE) and each RE may have a location within in the resource grid that may be uniquely identified by coordinates (k, l) where (k) represents a subcarrier location and (l) represents a symbol location.

A resource block (RB) may refer to 12 consecutive subcarriers in the frequency domain. RBs may be further characterized as common resource blocks (CRBs) or physical resource blocks (PRBs). CRBs may be indexed from 0 and upwards in the frequency domain for a particular subcarrier spacing (SCS) and PRBs may be defined within a bandwidth part (BWP) for a particular SCS. There is a defined relationship between CRBs and PRBs such that the location of a BWP and its PRBs may be determined relative to CRB index 0.

As mentioned above, the exemplary embodiments are described with regard to DMRS type 1 and DMRS type 2. For both DMRS type 1 and DMRS type 2, multiple DMRS ports may be mapped to the same REs. For example, an orthogonal cover code (OCC) of length 2 may be used in the frequency domain (FD-OCC) to enable two DMRS ports to utilize the same REs. When two symbol DMRS is utilized, the number of DMRS ports that may be mapped to the same REs may be further increased by using OCC of length 2 in the time domain (TD-OCC). Throughout this description, multiple DMRS ports that are configured to use the same REs but are separated in the code domain may be referred to as a "code division multiplex (CDM) group." To differentiate between different CDM groups, the exemplary embodiments may refer to CDM group 0, CDM group 1, CDM group 2, etc. Similarly, to differentiate between DMRS ports, the exemplary embodiments may refer to port 1, port 2, port 3, port 4, etc. However, the manner in which CDM groups and DMRS ports are numbered throughout this description is merely provided for illustrative purposes and is not intended to limit the exemplary embodiments in any way.

FIG. 4a shows an example 410 of DMRS type 1 CDM groups for single symbol DMRS arranged within a PRB according to various exemplary embodiments. Example 410 includes a PRB 412 comprising 12 subcarriers in the frequency domain and a single symbol in the time domain.

Example 410 includes CDM group 0 and CDM group 1. In FIG. 4a, to demonstrate the mapping of the different CDM groups to REs, the REs mapped to CDM group 0 are marked with a "0" and the REs mapped to CDM group 1 are marked with a "1". For DMRS type 1, each CDM group may be mapped to two REs within the symbol that are separated from one another by a single subcarrier in the frequency domain. CDM group 0 and CDM group 1 may be interlaced and occupy every other subcarrier within a span of four consecutive subcarriers. For example, CDM group 0 may occupy the even numbered subcarriers (e.g., 0, 2) and CDM group 1 may occupy the odd numbered subcarriers (e.g., 1, 3) (or vice versa). Although not shown in the example 410, in some configurations, the CDM group 0 and CDM group 1 pattern may repeat in the frequency domain using the next entries in the DMRS sequence.

For DMRS type 1, single symbol DMRS may support two DMRS ports per CDM group. Example 410 illustrates that two DMRS ports (e.g., port 0, port 1) may belong to CDM group 0 for single symbol DMRS. The DMRS ports of CDM group 0 may utilize the same REs but are separated in the code domain using the OCC of length 2 in the frequency domain. Similarly, example 410 illustrates that two DMRS ports (e.g., port 2, port 3) may belong to CDM group 1. The DMRS ports of CDM 1 group may utilize the same REs but are separated from one another in the code domain using the OCC of length 2 in the frequency domain. An example of the different orthogonal sequences are illustrated in FIG. 4a using the (+) and (−) symbols.

Figure 4B:
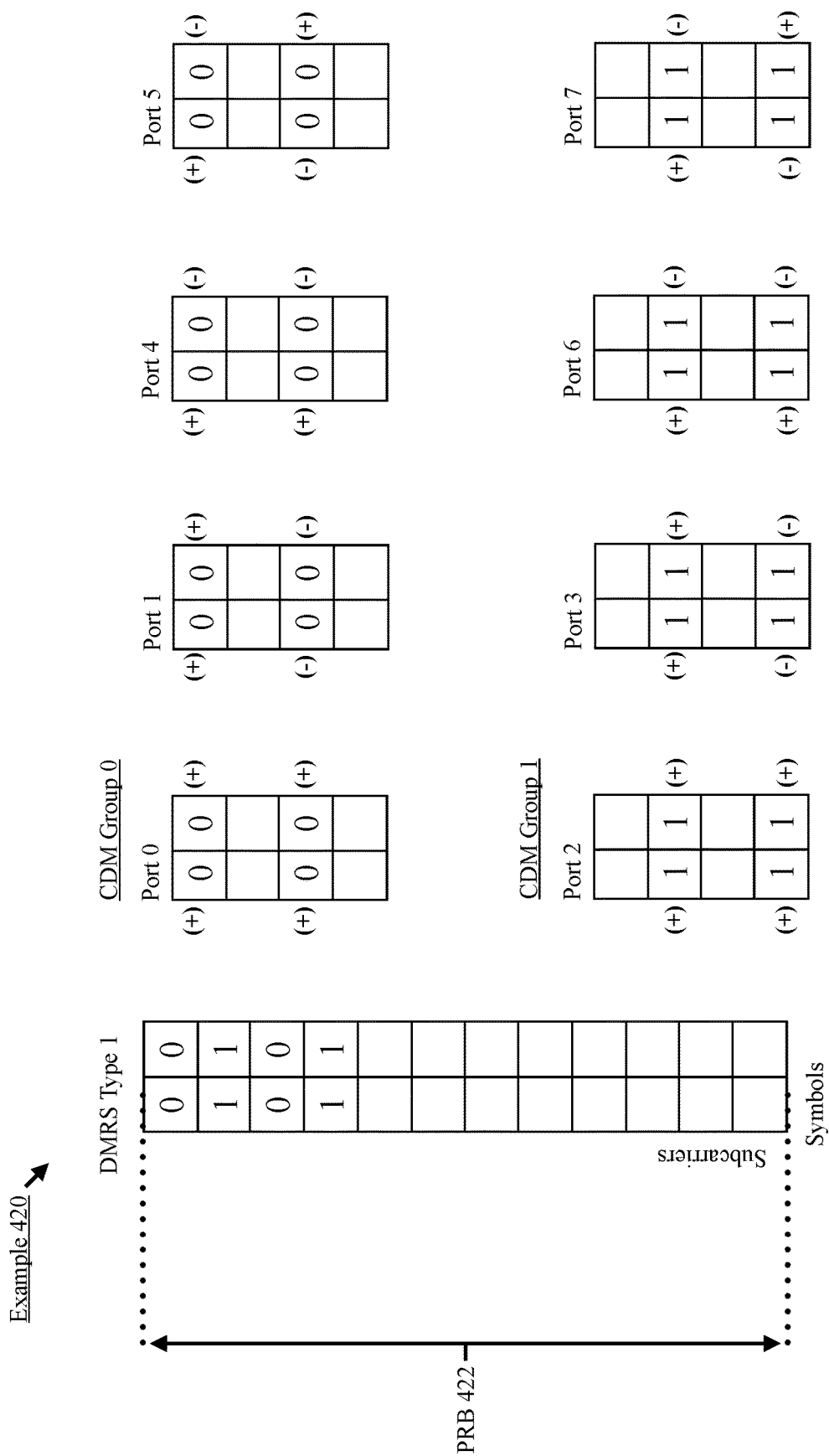

FIG. 4b shows an example 420 of DMRS type 1 CDM groups for two symbol DMRS arranged within a PRB according to various exemplary embodiments. Example 420 includes a PRB 422 comprising 12 subcarriers in the frequency domain and two symbols in the time domain.

Example 420 includes CDM group 0 and CDM group 1. In FIG. 4b, to demonstrate the mapping of the different CDM groups to REs, the REs mapped to CDM group 0 are marked with a "0" and the REs mapped to CDM group 1 are marked with a "1". For DMRS type 1, each CDM group may be mapped to a total of four REs. A first set of two adjacent REs in the time domain are separated from a second set of two adjacent REs in the time domain by a single subcarrier in the frequency domain. CDM group 0 and CDM group 1 may be interlaced and occupy every other subcarrier within a span of four consecutive subcarriers. For example, CDM group 0 may occupy the even numbered subcarriers (e.g., 0, 2) and CDM group 1 may occupy the odd numbered subcarriers (e.g., 1, 3) or vice versa. Although not shown in the example 420, in some configurations, the pattern of CDM group 0 and CDM group 1 may repeat in the frequency domain using the next entries in the DMRS sequence.

For DMRS type 1, two symbol DMRS may support four DMRS ports per CDM group. Example 420 illustrates that four DMRS ports (e.g., port 0, port 1, port 4, port 5) may belong to CDM group 0 for two symbol DMRS. The DMRS ports of CDM group 0 may utilize the same REs but are separated in the code domain using an OCC of 2 in the frequency domain and an OCC of length 2 in the time domain. Similarly, example 420 illustrates that four DMRS ports (e.g., port 2, port 3, port 6, port 7) belong to CDM group 1. The DMRS ports of a CDM group 1 may utilize the same REs but are separated from one another in the code domain using an OCC of 2 in the frequency domain and an OCC of length 2 in the time domain. An example of the different orthogonal sequences are illustrated in FIG. 4b using the (+) and (−) symbols.

DMRS type 2 may utilize three CDM groups. For single symbol DMRS, each DMRS type 2 CDM group may support two DMRS ports. For two symbol DMRS, each DMRS type 2 CMD group may support four DMRS ports. Thus, compared to DMRS type 1, DMRS type 2 may support a larger number of DMRS ports but have a lower DBMS density per DMRS port.

Figure 4C:
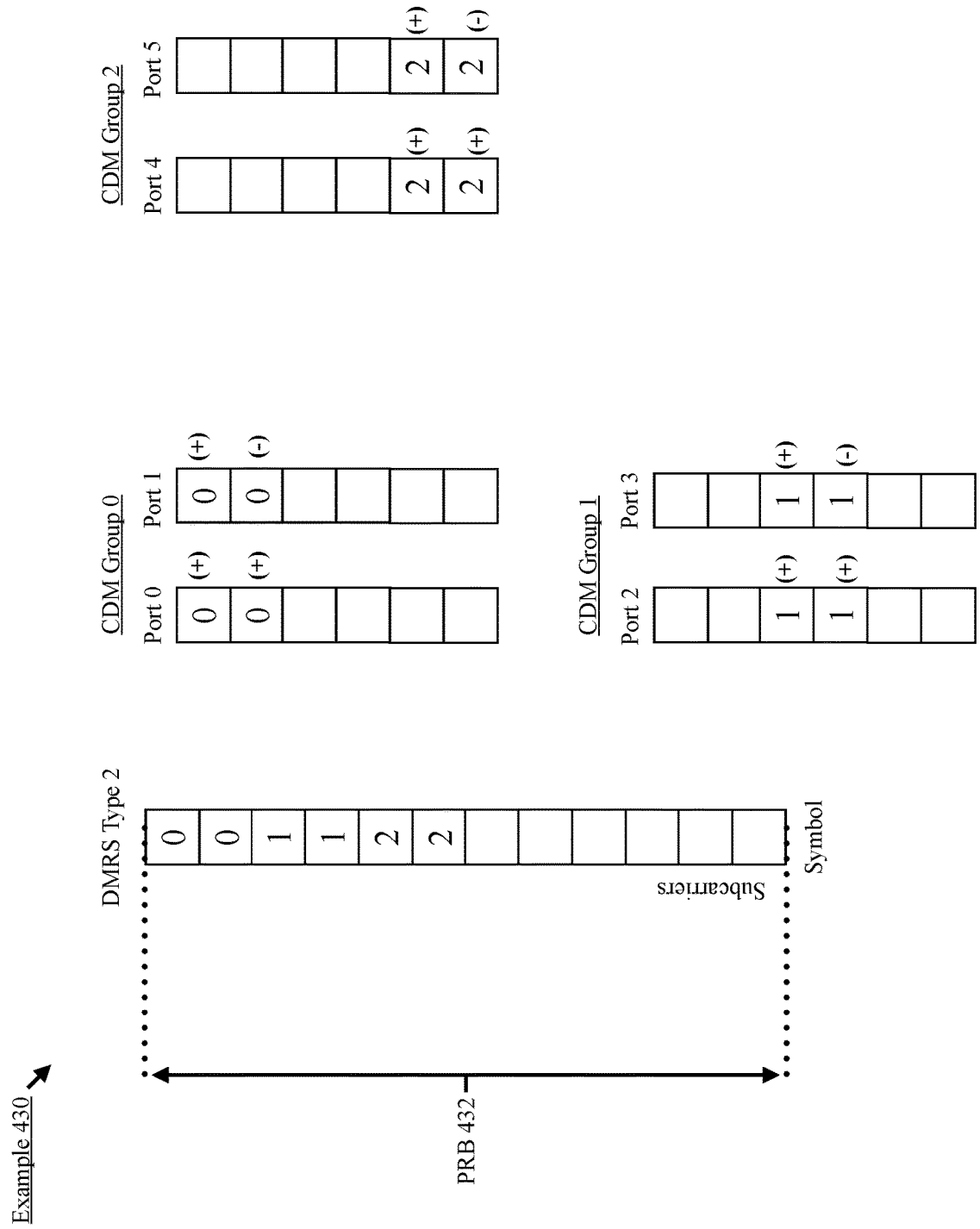

FIG. 4c shows an example 430 of DMRS type 2 CDM groups for single symbol DMRS arranged within a PRB according to various exemplary embodiments. Example 430 includes a PRB 432 comprising 12 subcarriers in the frequency domain and a single symbol in the time domain.

Example 430 includes CDM group 0, CDM group 1 and CDM group 2. In FIG. 4c, to demonstrate the mapping of the different CDM groups to REs, the REs mapped to CDM group 0 are marked with a "0," the REs mapped to CDM group 1 are marked with a "1" and the REs mapped to CDM group 2 are marked with a "2." For DMRS type 2, each CDM group may be mapped to a total of two REs. CDM group 0 may be mapped to two adjacent REs in the frequency domain, CDM group 1 may be mapped to two adjacent REs in the frequency domain and CDM group 2 may also mapped to two adjacent REs in the frequency domain. CDM groups 0-2 are arranged to occupy six consecutive subcarriers. Although not shown in the example 430, in some configurations, CDM group 0, CDM group 1 and CDM group 2 may repeat in the frequency domain using the next entries of the DMRS sequence.

For DMRS type 2, single symbol DMRS may support two DMRS ports per CDM group. Example 430 illustrates that two DMRS ports (e.g., port 0, port 1) may belong to CDM group 0 for single symbol DMRS. The DMRS ports of CDM group 0 may utilize the same REs but are separated in the code domain using an OCC of length 2 in the frequency domain. The example 430 also illustrates that two DMRS ports (e.g., port 2, port 3) may belong to CDM group 1. The DMRS ports of CDM 1 group may utilize the same REs but are separated from one another in the code domain using an OCC of length 2 in the frequency domain. The example 430 also illustrates that two DMRS ports (e.g., port 4, port 5) may belong to CDM group 2. The DMRS ports of CDM 2 group may utilize the same REs but are separated from one another in the code domain using an OCC of length 2 in the frequency domain. An example of the different orthogonal sequences are illustrated in FIG. 4c using the (+) and (−) symbols.

Figure 4D:
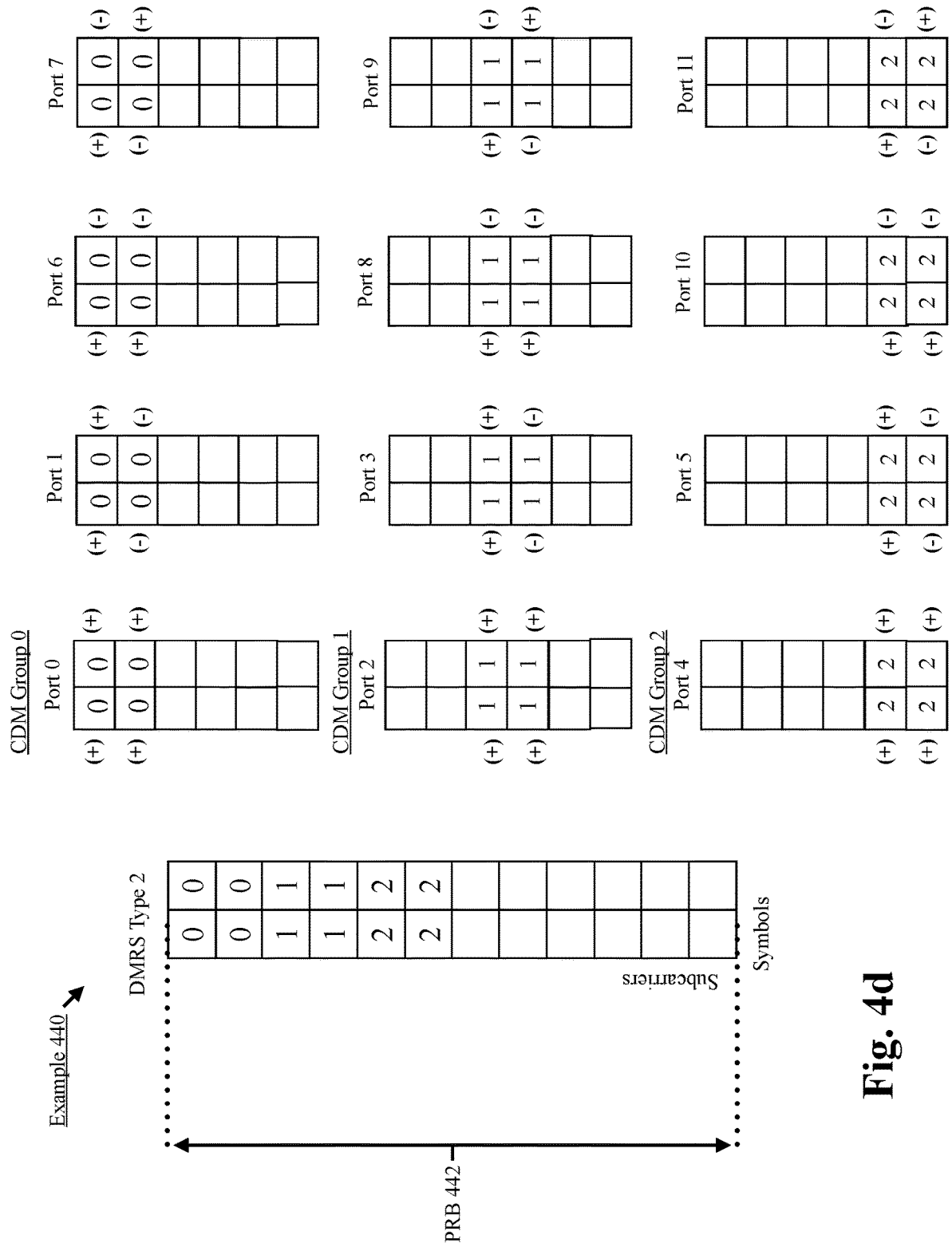

FIG. 4d shows an example 440 of DMRS type 2 CDM groups for two symbol DMRS arranged within a PRB according to various exemplary embodiments. Example 440 includes a PRB 442 comprising 12 subcarriers in the frequency domain and two symbols in the time domain.

Example 440 includes CDM group 0, CDM group 1 and CDM group 2. In FIG. 4d, to demonstrate the mapping of the different CDM groups to REs, the REs mapped to CDM group 0 are marked with a "0," the REs mapped to CDM group 1 are marked with a "1" and the REs mapped to CDM group 2 are marked with a "2." For DMRS type 2, each CDM group may be mapped to a total of four REs. CDM group 0 may be mapped to a two adjacent REs in the frequency domain per DMRS symbol, CDM group 1 may be mapped to two adjacent REs in the frequency domain per DMRS symbol and CDM group 2 may also mapped to two adjacent REs in the frequency domain per DMRS symbol. CDM groups 0-2 are arranged to occupy six consecutive subcarriers. Although not shown in the example 440, in some configurations, the pattern of CDM group 0, CDM group 1 and CDM group 2 may repeat in the frequency domain using the next entries of the DMRS sequence.

For DMRS type 2, single symbol DMRS may support four DMRS ports per CDM group. Example 440 illustrates that four DMRS ports (e.g., port 0, port 1, port 6, port 7) may belong to CDM group 0 for two symbol DMRS. The DMRS ports of CDM group 0 may utilize the same REs but are separated in the code domain using an OCC of 2 in the frequency domain and an OCC of length 2 in the time domain. Similarly, example 440 illustrates that four DMRS ports (e.g., port 2, port 3, port 8, port 9) may belong to CDM group 1. The DMRS ports of a CDM group 1 may utilize the same REs but are separated from one another in the code domain using an OCC of 2 in the frequency domain and an OCC of 2 in the time domain. Example 440 also illustrates that four DMRS ports (e.g., port 4, port 5, port 10, port 11) may belong to CDM group 2. The DMRS ports of CDM group 2 may utilize the same REs but are separated from one another in the code domain using an OCC of 2 in the frequency domain and an OCC of 2 in the time domain. An example of the different orthogonal sequences are illustrated in FIG. 4d using the (+) and (−) symbols.

For DMRS type 1 and DMRS type 2, multiple PRBs may occupy the same one or more symbols and be indexed 0 to (N) in the frequency domain. In some configurations, each of the PRBs indexed 0-N may contain REs mapped to the same CDM groups.

According to some aspects, the exemplary embodiments include techniques for implementing a larger FD-OCC length pattern to support a larger number of DBMS ports. In a first approach, for CP-OFDM, an FD-OCC of length four is used to increase the number of supported DMRS ports. Examples of this are described in more detail below with regard to FIGS. 5a-5b. In a second approach, for CP-OFDM, an FD-OCC of length six is used to increase the number of supported DMRS ports. Examples of this are described in more detail below with regard to FIG. 6.

Figure 5A:
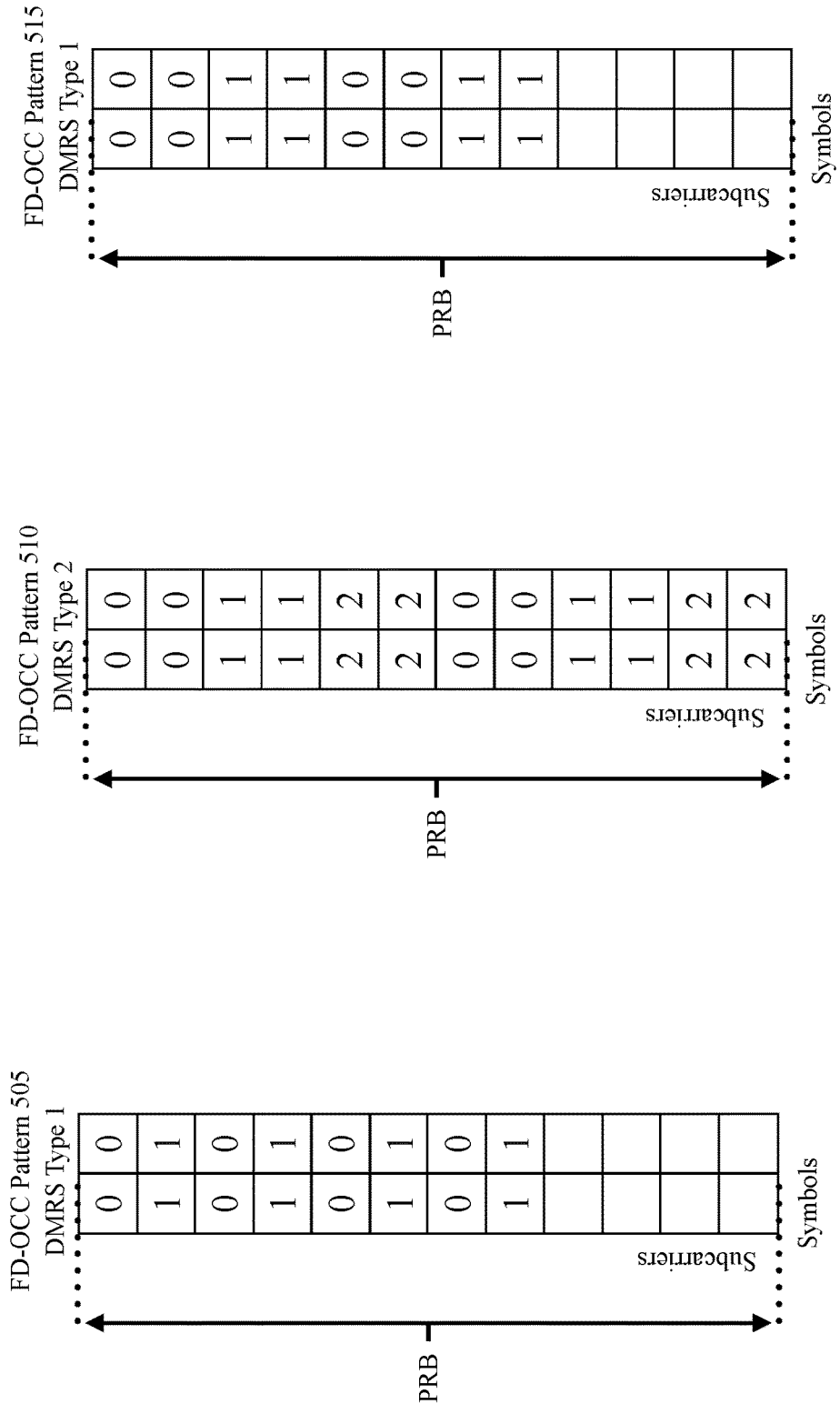
FIGS. 5a-5b shows exemplary frequency domain (FD)—orthogonal cover code (OCC) patterns according to various exemplary embodiments.
Figure 5B:
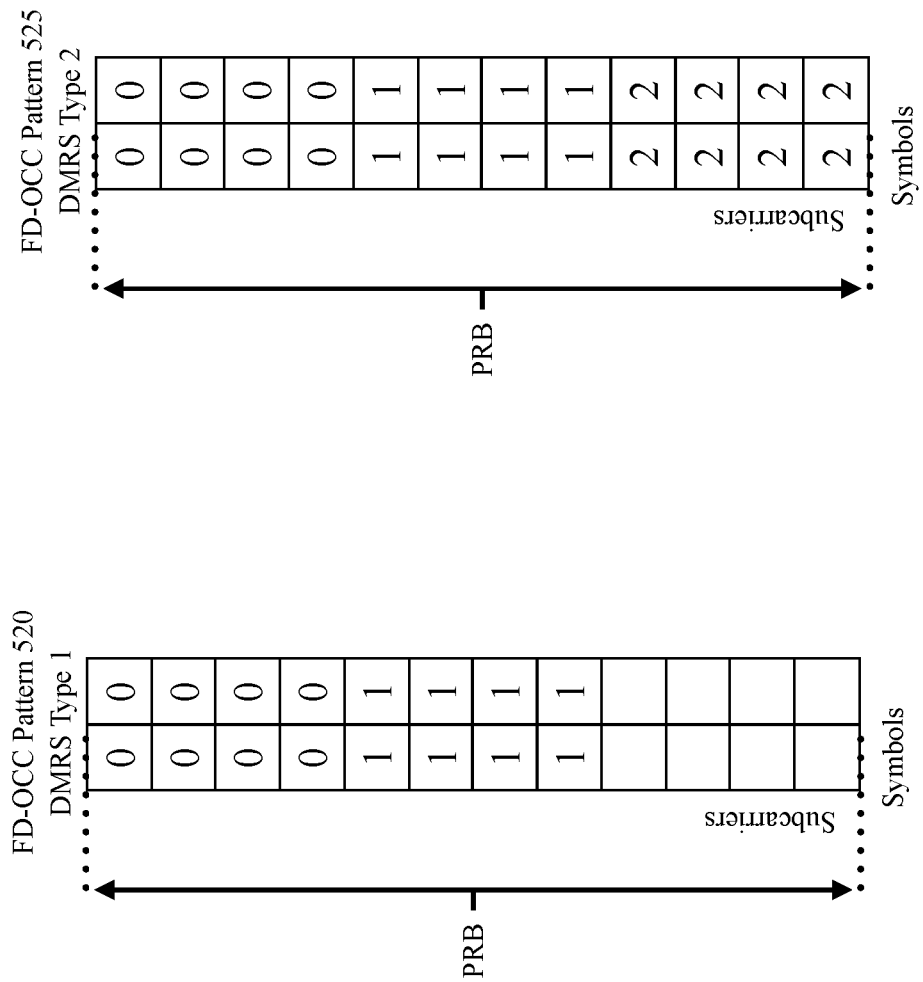

FIGS. 5a-5b show exemplary FD-OCC patterns according to various exemplary embodiments. Each of the FD-OCC patterns of FIGS. 5a-5b are configured with an FD-OCC of length four.

FIG. 5a shows FD-OCC patterns 505-515. FD-OCC pattern 505 shows two symbol DMRS type 1 comprising CDM group 0 and CDM group 1 within a PRB and may support up to 16 DMRS ports. REs occupied by CDM group 0 are marked with a "0" and REs occupied by CDM group 1 are marked with a "1."

In FD-OCC pattern 505, for a span of 8 consecutive subcarriers in the frequency domain, CDM group 0 and CDM group 1 occupy every other subcarrier. This is an example of concatenating two occasions of the legacy CDM group arrangement for DMRS type 1. Although not show in FIG. 5, using the FD-OCC pattern 505 for one symbol DMRS type 1 comprising CDM group 0 and CDM group 1 within a PRB and may support up to eight DMRS ports.

FD-OCC pattern 510 shows two symbol DMRS type 2 comprising CDM group 0, CDM group 1 and CDM group 2 within a PRB and may support up to 24 DMRS ports. REs occupied by CDM group 0 are marked with a "0," REs occupied by CDM group 1 are marked with a "1" and REs occupied by CDM group 2 are marked with a "2".

In FD-OCC pattern 510, CDM group 0 occupies a first set of consecutive subcarriers, CDM group 1 occupies a second set of consecutive subcarriers and CDM group 2 occupies a third set of consecutive subcarriers. This pattern is repeated in the second half of the PRB. Therefore, CDM group 0 occupies two sets of consecutive subcarriers within the PRB that are separated from one another by a set of consecutive subcarriers occupied by CDM group 1 and a set of consecutive subcarriers occupied by CDM group 2. CDM group 1 occupies two sets of consecutive subcarriers within the PRB that are separated from one another by a set of consecutive subcarriers occupied by CDM group 2 and a set of consecutive subcarriers occupied by CDM group 0. CDM group 2 occupies two sets of consecutive subcarriers within the PRB that are separated from one another by a set of consecutive subcarriers occupied by CDM group 0 and a set of consecutive subcarriers occupied by CDM group 1. This is an example of concatenating two occasions of the legacy CDM group arrangement for DMRS type 2. Although not show in FIG. 5, using the FD-OCC pattern 510 for one symbol DMRS type 2 comprising CDM group 0, CDM group 1 and CDM group 2 within a PRB and may support up to 12 DMRS ports.

As indicated above FD-OCC patterns 505 and 510 are examples of concatenating two occasions of the legacy CDM group arrangement for DMRS type 1 and DMRS type 2 respectively. This approach may allow for better co-scheduling compatibility with legacy approaches.

FD-OCC pattern 515 shows two symbol DMRS type 1 comprising CDM group 0 and CDM group 1 within a PRB and may support up to 16 DMRS ports. REs occupied by CDM group 0 are marked with a "0" and REs occupied by CDM group 1 are marked with a "1."

In FD-OCC pattern 515, CDM group 0 occupies a first set of consecutive subcarriers, CDM group 1 occupies a second set of consecutive subcarriers. This pattern is repeated in the PRB. Therefore, CDM group 0 occupies two sets of consecutive subcarriers within the PRB that are separated from one another by a set of consecutive subcarriers occupied by CDM group 1 and CDM group 1 occupies two sets of consecutive subcarriers within the PRB that are separated from one another by a set of consecutive subcarriers occupied by CDM group 0. Although not show in FIG. 5, using the FD-OCC pattern 515 for one symbol DMRS type 1 comprising CDM group 0 and CDM group 1 within a PRB and may support up to eight DMRS ports.

FIG. 5b shows FD-OCC patterns 520-525. FD-OCC pattern 520 shows two symbol DMRS type 1 comprising CDM group 0 and CDM group 1 within a PRB and may support up to 16 DMRS ports. In FD-OCC pattern 520 each CDM group comprises four consecutive subcarriers. REs occupied by CDM group 0 are marked with a "0" and REs occupied by CDM group 1 are marked with a "1." Although not show in FIG. 5, using the FD-OCC pattern 520 for one symbol DMRS type 1 comprising CDM group 0 and CDM group 1 within a PRB and may support up to eight DMRS ports.

FD-OCC pattern 525 shows two symbol DMRS type 2 comprising CDM group 0, CDM group 1 and CDM group 2 within a PRB and may support up to 24 DMRS ports. In FD-OCC pattern 525 each CDM group comprises four consecutive subcarriers. REs occupied by CDM group 0 are marked with a "0," REs occupied by CDM group 1 are marked with a "1" and REs occupied by CDM group 2 are marked with a "2." Although not show in FIG. 5, using the FD-OCC pattern 525 for one symbol DMRS type 2 comprising CDM group 0, CDM group 1 and CDM group 0 within a PRB and may support up to 12 DMRS ports.

Compared to FD-OCC patterns 505-510, FD-OCC patterns 515-525 are more robust to frequency selective fading. FD-OCC patterns 520 and 525 may be considered the most robust option to frequency selective fading (e.g., channel with larger delay spread).

Figure 6:
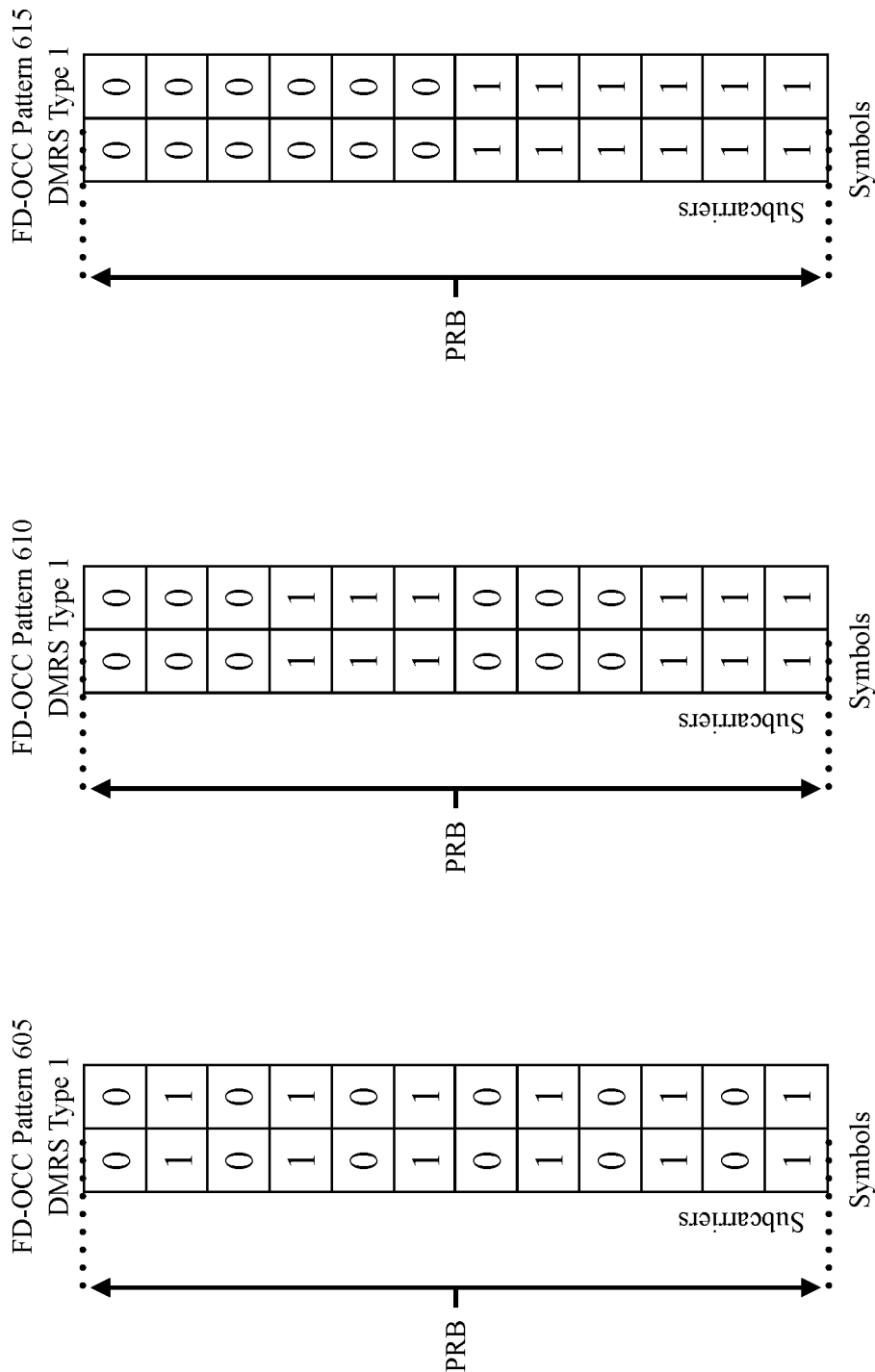
FIG. 6 shows exemplary FD-OCC patterns according to various exemplary embodiments.

FIG. 6 shows exemplary FD-OCC patterns according to various exemplary embodiments. Each of the FD-OCC patterns of FIG. 6 are configured with an FD-OCC of length six.

FD-OCC pattern 605 shows two symbol DMRS type 1 comprising CDM group 0 and CDM group 1 within a PRB and may support up to 16 DMRS ports. REs occupied by CDM group 0 are marked with a "0" and REs occupied by CDM group 1 are marked with a "1." In FD-OCC pattern 605, CDM group 0 and CDM group 1 occupy every other subcarrier of the PRB. This is an example of concatenating three occasions of the legacy CDM group arrangement for DMRS type 1. Although not show in FIG. 6, using the FD-OCC pattern 565 for one symbol DMRS type 1 comprising CDM group 0 and CDM group 1 within a PRB and may support up to twelve DMRS ports.

As indicated above FD-OCC pattern 605 is an example of concatenating three occasions of the legacy CDM group arrangement for DMRS type 1. This approach may allow for better co-scheduling compatibility with legacy approaches.

FD-OCC pattern 610 shows two symbol DMRS type 1 comprising CDM group 0 and CDM group 1 within a PRB and may support up to 24 DMRS ports. REs occupied by CDM group 0 are marked with a "0" and REs occupied by CDM group 1 are marked with a "1." In FD-OCC pattern 610, CDM group 0 occupies a first set of three consecutive subcarriers and CDM group 1 occupies a second set of three consecutive subcarriers. This pattern is repeated in the PRB. Therefore, CDM group 0 occupies two sets of three consecutive subcarriers within the PRB that are separated from one another by a set of three consecutive subcarriers occupied by CDM group 1 and CDM group 1 occupies two sets of three consecutive subcarriers within the PRB that are separated from one another by a set of three consecutive subcarriers occupied by CDM group 0. Although not show in FIG. 6, using the FD-OCC pattern 610 for one symbol DMRS type 1 comprising CDM group 0 and CDM group 1 within a PRB and may support up to twelve DMRS ports.

FD-OCC pattern 615 shows two symbol DMRS type 1 comprising CDM group 0 and CDM group 1 within a PRB and may support up to 24 DMRS ports. REs occupied by CDM group 0 are marked with a "0" and REs occupied by CDM group 1 are marked with a "1." In FD-OCC pattern 615 each CDM group comprises six consecutive subcarriers. Although not show in FIG. 6, using the FD-OCC pattern 615 for one symbol DMRS type 1 comprising CDM group 0 and CDM group 1 within a PRB and may support up to twelve DMRS ports.

Compared to FD-OCC pattern 605, FD-OCC patterns 610-615 are more robust to frequency selective fading. FD-OCC patterns 615 may be considered the most robust option to frequency selective fading (e.g., channel with larger delay spread).

The network may support multiple different FD-OCC patterns to handle different conditions and configure the UE 110 with the different FD-OCC patterns using one or more radio resource control (RRC) messages. For example, the network may indicate the FD-OCC pattern in a DMRS-DownlinkConfig information element (IE) for downlink communication and the FD-OCC pattern in a DMRS-UplinkConfig IE for uplink communication. In some embodiments, the network may configure the UE 110 with multiple different patterns and change which FD-OCC pattern is to be used semi-statically or dynamically. For example, the network may configure the UE 110 with multiple different FD-OCC patterns to be used for uplink and/or downlink communication. The network may then transmit a medium access control (MAC) control element (CE) or downlink control information (DCI) to semi-statically or dynamically change the FD-OCC pattern to be used.

For DMRS type 1, when FD-OCC of length 4 is used, a scenario may occur where a CDM group may cross two PRBs or PRGs. Those skilled in the art will understand that PRG refers to a physical resource block group configured for physical downlink shared channel (PDSCH). Each PRG contains a number of PRBs (e.g., 2 PRBs, 4 PRBs, wideband). An example of this is described in more detail below with regard to FIG. 7.

It has been identified that there is a need for enhancements and techniques that consider the possibility of a CDM group crossing a PRB and/or PRG boundary when increasing the FD-OCC to a length of four for DMRS type 1 to support additional DMRS ports.

Figure 7:
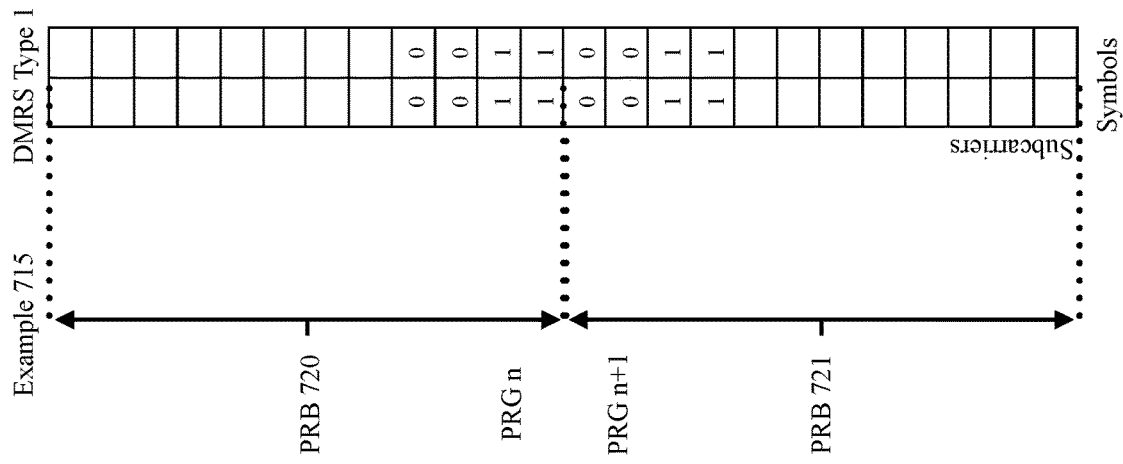
FIG. 7 shows examples of a CDM group configured to cross a PRB according to various exemplary embodiments.
Figure 7:
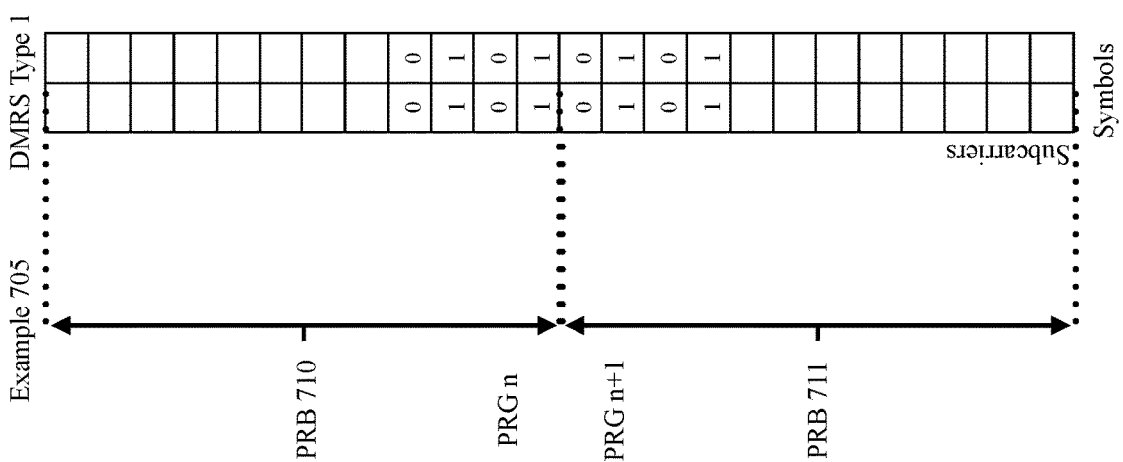

FIG. 7 shows examples of a CDM group configured to cross a PRB according to various exemplary embodiments.

Example 705 shows two symbol DMRS type 1 comprising CDM group 0 and CDM group 1 occupying symbols across a first PRB and a second PRB. The REs mapped to CDM group 0 are marked with a "0" and the REs mapped to CDM group 1 are marked with a "1".

In this example, consecutive PRBs are indexed where an even indexed PRB 710 is shown adjacent to an odd indexed PRB 711. In addition, even indexed PRB 710 is shown as being part of a first PRG (n) and odd indexed PRB 711 is shown as being part of a second PRG (n+1). In example 705, the FD-OCC pattern is the same FD-OCC pattern shown in FD-OCC pattern 605 of FIG. 6.

Example 715 shows two symbol DMRS type 1 comprising CDM group 0 and CDM group 1 occupying symbols across a first PRB and a second PRB. The REs mapped to CDM group 0 are marked with a "0" and the REs mapped to CDM group 1 are marked with a "1".

In this example, consecutive PRBs are indexed where an even indexed PRB 720 is shown adjacent to an odd indexed PRB 721. In addition, even indexed PRB 720 is shown as being part of a first PRG (n) and odd indexed PRB 721 is shown as being part of a second PRG (n+1). In example 715, the FD-OCC pattern is the same FD-OCC pattern shown in FD-OCC pattern 615 of FIG. 6.

The exemplary embodiments provided below consider the possibility of a CDM group crossing a PRB and/or PRG boundary (non-limiting examples of which are shown in FIG. 7). These exemplary embodiments may be used to support the implementation of DMRS type 1 with an OCC of length four for uplink and/or downlink communication.

In a first approach, when FD-OCC of length four is used for DMRS type 1 to support an increased number of DMRS ports (e.g., 8, 16, etc.), the UE 110 may not be expected to have any CDM groups that across a PRG boundary. Thus, for downlink communication, the network may not transmit and the UE 110 may not receive signals that comprise CDM groups arranged in a manner where a single CDM group occupies REs of a first PRG and REs of a second different PRG (e.g., PRG (n) and PRG (n+1) in FIG. 7). For uplink communication, the network may not receive and the UE 110 may not transmit signals that comprise CDM groups arranged in a manner where a single CDM group occupies REs of a first PRG and REs of a second different PRG (e.g., PRG (n) and PRG (n+1) of FIG. 7).

In a second approach, when FD-OCC of length four is used for DMRS type 1 to support an increased number of DMRS ports (e.g., 8, 16, etc.), the UE 110 may not be expected to have any CDM groups that across a PRB boundary. Thus, for downlink communication, the network may not transmit and the UE 110 may not receive signals that comprise CDM groups arranged in a manner where a single CDM group occupies REs of a first PRB and REs of a second different PRB (e.g., PRB 710 and PRB 711 or PRB 720 and PRB 721 of FIG. 7). For uplink communication, the network may not receive and the UE 110 may not transmit signals that comprise CDM groups arranged in a manner where a single CDM group occupies REs of a first PRB and REs of a second different PRG (e.g., PRG (n) and PRG (n+1) in FIG. 7).

In another approach, for DMRS type 1, the use of a FD-OCC length of four may be limited to only wideband PRG. Thus, the network may only configure the use of FD-OCC length four to be used for DMRS type 1 when wideband PRG is also configured.

In another approach, when DMRS type 1 is configured with an FD-OCC length of four and a CDM group is configured to cross a PRG boundary (e.g., occupy REs of a first PRG and REs of a second different PRG), the UE 110 may assume that the precoding used in both adjacent PRGs is the same. For downlink communication, the UE 110 may make this implicit determination and decode the contents of the REs of the CDM group that cross the PRG boundary using the assumption that the precoding for both PRGs is the same. For uplink communication, the UE 110 may only map the contents of a CDM group to cross a PRG boundary if the precoding used for both PRGs are the same.

In addition, the exemplary embodiments introduce techniques to avoid a CDM group being configured to cross a PRG boundary for PDSCH frequency domain resource allocation. FIG. 8 shows a signaling diagram 800 for providing the UE 110 with a configuration information for CP-OFDM and DMRS ports according to various exemplary embodiments. The signaling diagram 800 includes the UE 110 and the gNB 120A.

In 805, the UE 110 receives configuration information. The configuration information may be received in a radio resource control (RRC) message, a medium access control (MAC) control element (CE), downlink control information (DCI) or any other appropriate type of information.

The configuration information may include DMRS port configuration information such as, but not limited to, a maximum number of supported DMRS ports and a maximum number of supported CDM groups.

In addition, the network may provide the UE 110 with other configuration information. For example, in 5G NR, PRG configuration for frequency selective precoding may be configured to contain two PRBs, four PRBs or in a wideband configuration. Those skilled in the art will understand the PRG is configured with reference to point A (e.g., common resource block 0).

For downlink frequency domain resource allocation (FDRA), 5G NR supports FDRA type 0 and FDRA type 1. Those skilled in the art will understand that for FDRA type 0 a bitmap may be used where each bit represents a corresponding resource block group (RBG). The RGB size choices are hard encoded in 3GPP specifications for different bandwidth part (BWP) size. The RBG may be counted with reference to point A (e.g., common resource block 0).

As will be described in more detail below, the exemplary embodiments introduce conditions to avoid a CDM group being configured across a PRG boundary. These conditions may be present in the configuration information of 805.

In 810, the UE 110 receives a DMRS port indication from the gNB 120A. When the network schedules PDSCH or PUSCH, the network may indicate which DMRS ports are assigned to the UE 110. The DMRS port indication may indicate which DMRS ports to be used for DMRS transmission. In addition, the DMRS port indication may facilitate MU-MIMO operations and/or DMRS power boosting.

The DMRS ports may be applicable to the uplink and/or downlink. Thus, in 815a, if the scheduling DCI is for PUSCH or any other appropriate type of uplink communication, the UE 110 may perform an uplink transmission using the indicated DMRS ports. Alternatively, in 815b, if the scheduling DCI is for PDSCH or any other appropriate type of downlink communication, the UE 110 may perform a downlink reception using the indicated DMRS ports.

As mentioned above, according to some aspects, the exemplary embodiments introduce the following conditions to avoid a CDM group being configured across a PRG boundary for PDSCH FDRA type 0. The exemplary conditions may be present in configuration information provided to the UE 110 (e.g., 805 of the signaling diagram 800) or hard encoded in 3GPP specifications and used in combination with one another or independently from one another.

In one example, a CDM group configuration may be applied per RBG. The starting point of the CDM group arrangement may be point A (e.g., common resource block 0). In another example, the first and last indicated RBG in the bitmap may contain an even number of PRBs. The other RBGs in the bitmap are already guaranteed to have an even number of PRBs.

In another example, if the first indicated RBG in the bitmap contain an odd number of PRBs, the first PRB is assumed to have no DMRS or the DMRS is ignored. If the last indicated RBG in the bitmap contains odd number of PRBs, the last PRB is assumed to have no DMRS or the DMRS is ignored.

For FDRA type 1, the frequency resource allocation may be a set of contiguously allocated PRB indicated by the starting PRB relative to the beginning of the BWP and a number of contiguously allocated PRBS.

According to some aspects, the exemplary embodiments introduce the following conditions to avoid a CDM group being configured across a PRG boundary for PDSCH FDRA type 1. The exemplary conditions may be present in configuration information provided to the UE 110 (e.g., 805 of the signaling diagram 800) or hard encoded in 3GPP specifications and used in combination with one another or independently from one another.

In the following examples, it is assumed that the CDM group is applied starting from point A. In one example, for FDRA type 1 indicated/configured for PDSCH, the starting PRB has an even number of PRBs from point A. In another example, for FDRA type 1 indicated/configured for PDSCH, even number of PRBs are scheduled (e.g., the length is an even number of PRBs). In another example, for FDRA type 1 indicated/configured for PDSCH, if the starting PRB has an odd number or PRBs from point A, the first PRB is assumed to have no DMRS or the DMRS is ignored. In another example, for FDRA type 1 indicated/configured for PDSCH, if the last scheduled PRB has an odd number of PRBs from point A, the last scheduled PRB is assumed to have no DMRS or the DMRS is ignored.

In another approach, to avoid a CDM group being configured across a PRG boundary for PDSCH FDRA type 1, one or more of the following conditions may be implemented. The exemplary conditions may be present in configuration information provided to the UE 110 (e.g., 805 of the signaling diagram 800) or hard encoded in 3GPP specifications and used in combination with one another or independently from one another. In the following examples, it is assumed that the CDM group is applied starting from first scheduled PRB. In one example, even number of PRBs are scheduled (e.g., length is an even number). In another example, for FDRA type 1 indicated/configured for PDSCH, if an odd number of PRBs are scheduled, the last scheduled PRB is assumed to have no DMRS or DMRS is ignored.

Examples

In a first example, a processor of a user equipment (UE) is configured to establish a connection to a fifth generation (5G) new radio (NR) network, wherein the connection is configured to utilize cyclic prefix (CP)—orthogonal frequency division multiplexing (OFDM) waveform and demodulation reference signal (DMRS) type 1, receive a DMRS port indication configured to indicate one or more DMRS ports assigned to the UE, wherein single symbol DMRS type 1 is configured to support up to 8 DMRS ports and two symbol DMRS type 1 is configured to support up to 16 DMRS ports and perform a transmission operation or a reception operation using the one or more DMRS ports assigned to the UE.

In a second example, the processor of the first example, wherein the connection further comprises a physical downlink shared channel (PDSCH) frequency domain resource allocation (FDRA) type 0 configuration.

In a third example, the processor of the second example, wherein code division multiplex (CDM) groups are configured per resource block group (RBG).

In a fourth example, the processor of the second example, wherein a code division multiple (CDM) group is applies starting from point A common resource block.

In a fifth example, the processor of the second example, wherein a bitmap indicates a resource block group (RBG) configuration, wherein a first and last indicated RBG in the bitmap contains an even number of physical resource blocks (PRB).

In a sixth example, the processor of the second example, wherein a bitmap indicates a resource block group (RBG) configuration, wherein a first indicated RBG in the bitmap contains an even odd number of physical resource blocks (PRB), and wherein the first indicated PRB does not contain DMRS or the first indicated PRB contains DMRS and the DMRS is ignored.

In a seventh example, the processor of the second example, wherein a bitmap indicates a resource block group (RBG) configuration, wherein a last indicated RBG in the bitmap contains an odd number of physical resource blocks (PRB), and wherein the last indicated PRB does not contain DMRS or the last indicated PRB contains DMRS and the DMRS is ignored.

In an eighth example, the processor of the first example, wherein the connection further comprises a physical downlink shared channel (PDSCH) frequency domain resource allocation (FDRA) type 1 configuration.

In a ninth example, the processor of the eighth example, wherein a code division multiple (CDM) group is applied starting from point A, wherein a starting physical resource block (PRB) has an even number of PRBs from the point A.

In a tenth example, the processor of the eighth example, wherein a code division multiple (CDM) group is applied starting from point A and an even number of physical resource blocks (PRBs) are scheduled.

In an eleventh example, the processor of the eighth example, wherein a code division multiple (CDM) group is applied starting from point A, wherein a starting physical resource block (PRB) has an odd number of PRBs from point A, and wherein the first PRB does not contain DMRS or the first PRB contains DMRS that is ignores.

In a twelfth example, the processor of the eighth example, wherein a code division multiple (CDM) group is applied starting from point A, wherein a last physical resource block (PRB) has an odd number of PRBs from point A, and wherein the last PRB does not contain DMRS or the last PRB contains DMRS that is ignored.

In a thirteenth example, the processor of the eighth example, wherein a code division multiple (CDM) group is applied starting from a first scheduled physical resource block (PRB), wherein an even number of PRBs are scheduled.

In a fourteenth example, the processor of the eighth example, wherein a code division multiple (CDM) group is applied starting from a first scheduled physical resource block (PRB), wherein an odd number of PRBs are scheduled, and wherein a last PRB does not contain DMRS or the last PRB contains DMRS that is ignored.

In a fifteenth example, a user equipment (UE) comprising a transceiver configured to communicate with a fifth generation (5G) new radio (NR) network and the processor of any of the first through fourteenth examples that is communicatively coupled to the transceiver.

In a sixteenth example, a processor of a user equipment (UE) is configured to establish a connection to a fifth generation (5G) new radio (NR) network, wherein the connection is configured to utilize cyclic prefix (CP)—orthogonal frequency division multiplexing (OFDM) waveform and demodulation reference signal (DMRS) type 2, receive a DMRS port indication configured to indicate one or more DMRS ports assigned to the UE, wherein single symbol DMRS type 2 is configured to support up to 12 DMRS ports and two symbol DMRS type 2 is configured to support up to 24 DMRS ports and perform a transmission operation or a reception operation using the one or more DMRS ports assigned to the UE.

In a seventeenth example, the processor of the sixteenth example, wherein the connection further comprises a physical downlink shared channel (PDSCH) frequency domain resource allocation (FDRA) type 0 configuration.

In an eighteenth example, the processor of the seventeenth example, wherein code division multiplex (CDM) groups are configured per resource block group (RBG).

In a nineteenth example, the processor of the seventeenth example, wherein a bitmap indicates a resource block group (RBG) configuration, wherein a first and last indicated RBG in the bitmap contains an even number of physical resource blocks (PRB).

In a twentieth example, the processor of the seventeenth example, wherein a bitmap indicates a resource block group (RBG) configuration, wherein a first indicated RBG in the bitmap contains an even eve number of physical resource blocks (PRB), and wherein the last indicated PRB does not contain DMRS or the first indicated PRB contains DMRS and the DMRS is ignored.

In an twenty first example, the processor of the seventeenth example, wherein a bitmap indicates a resource block group (RBG) configuration, wherein a last indicated RBG in the bitmap contains an even odd number of physical resource blocks (PRB), and wherein the last indicated PRB does not contain DMRS or the first indicated PRB contains DMRS and the DMRS is ignored.

In an twenty second example, the processor of the sixteenth example, wherein the connection further comprises a physical downlink shared channel (PDSCH) frequency domain resource allocation (FDRA) type 1 configuration.

In an twenty third example, the processor of the twenty second example, wherein a code division multiple (CDM) group is applied starting from point A, wherein a starting physical resource block (PRB) has an even number of PRBs from point A.

In an twenty fourth example, the processor of the twenty second example, wherein a code division multiple (CDM) group is applied starting from point A and an even number of physical resource blocks (PRBs) are scheduled.

In an twenty fifth example, the processor of the twenty second example, wherein a code division multiple (CDM) group is applied starting from point A, wherein a starting physical resource block (PRB) has an odd number of PRBs from point A, and wherein the first PRB does not contain DMRS or the first PRB contains DMRS that is ignores.

In an twenty sixth example, the processor of the twenty second example, wherein a code division multiple (CDM) group is applied starting from point A, wherein a last physical resource block (PRB) has an odd number of PRBs from point A, and wherein the last PRB does not contain DMRS or the last PRB contains DMRS that is ignored.

In an twenty seventh example, the processor of the twenty second example, wherein a code division multiple (CDM) group is applied starting from a first scheduled physical resource block (PRB), wherein an even number of PRBs are scheduled.

In an twenty eighth example, the processor of the twenty second example, wherein a code division multiple (CDM) group is applied starting from a first scheduled physical resource block (PRB), wherein an odd number of PRBs are scheduled, and wherein a last PRB does not contain DMRS or the last PRB contains DMRS that is ignored.

In a twenty ninth example, a user equipment (UE) comprising a transceiver configured to communicate with a fifth generation (5G) new radio (NR) network and the processor of any of the sixteenth through twenty eighth examples that is communicatively coupled to the transceiver.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to:
   establish a connection to a fifth generation (5G) new radio (NR) network, wherein the connection is configured to utilize cyclic prefix (CP)—orthogonal frequency division multiplexing (OFDM) waveform and demodulation reference signal (DMRS) type 1;
   receive a DMRS port indication configured to indicate one or more DMRS ports assigned to the UE, wherein single symbol DMRS type 1 is configured to support up to 8 DMRS ports and two symbol DMRS type 1 is configured to support up to 16 DMRS ports;
   receive a bitmap for a physical downlink shared channel (PDSCH), wherein a first resource block group (RBG) and a last RBG indicated in the bitmap contain an even number of physical resource blocks (PRBs); and
   perform a transmission operation or a reception operation using the one or more DMRS ports assigned to the UE.

2. The processor of claim 1, wherein the connection is further configured with a frequency domain (FD)—orthogonal cover code (OCC) length of 4.

3. The processor of claim 2, wherein a physical resource block (PRB) comprises at least a first code division multiplex (CDM) group and a second CDM group that occupy every other subcarrier for a span of 8 consecutive subcarriers of the PRB.

4. The processor of claim 2, wherein a physical resource block (PRB) comprises at least a first code division multiplex (CDM) group and a second CDM group,
   wherein the first CDM group occupies two sets of 2 consecutive subcarriers of the PRB, and
   wherein the second CDM group occupies two sets of 2 consecutive subcarriers of the PRB.

5. The processor of claim 2, wherein a physical resource block (PRB) comprises at least a first code division multiplex (CDM) group and a second CDM group,
   wherein the first CDM group occupies a set of 4 consecutive subcarriers of the PRB, and
   wherein the second CDM group occupies a set of 4 consecutive subcarriers of the PRB.

6. The processor of claim 2, wherein a physical resource block (PRB) comprises at least a first code division multiplex (CDM) group and a second CDM group,
   wherein neither the first CDM group or the second CDM group are configured across a PRB boundary.

7. The processor of claim 2, wherein a physical resource block (PRB) comprises at least a first code division multiplex (CDM) group and a second CDM group,
   wherein neither the first CDM group or the second CDM group are configured across a physical resource block group (PRG) boundary.

8. The processor of claim 2, wherein the FD-OCC length of 4 is only configured for a wideband physical resource block group (PRG) configuration.

9. The processor of claim 2, wherein a physical resource block (PRB) comprises at least a first code division multiplex (CDM) group and a second CDM group,
   wherein the first CDM group and the second CDM group are configured across a physical resource block group (PRG) boundary between an adjacent first PRG and a second PRG, and
   wherein a precoding is used in both the first PRG and the second PRG.

10. The processor of claim 1, wherein the connection is further configured with a frequency domain (FD)—orthogonal cover code (OCC) length of 6.

11. The processor of claim 10, wherein a physical resource block (PRB) comprises at least a first code division multiplex (CDM) group and a second CDM group that occupy every other subcarrier of the PRB.

12. The processor of claim 10, wherein a physical resource block (PRB) comprises at least a first code division multiplex (CDM) group and a second CDM group,
   wherein the first CDM group occupies two sets of 3 consecutive subcarriers of the PRB, and
   wherein the second CDM group occupies two sets of 3 consecutive subcarriers of the PRB.

13. The processor of claim 10, wherein a physical resource block (PRB) comprises at least a first code division multiplex (CDM) group and a second CDM group,
   wherein the first CDM group occupies a set of 6 consecutive subcarriers of the PRB, and
   wherein the second CDM group occupies a set of 6 consecutive subcarriers of the PRB.

14. The processor of claim 1, wherein the UE is configured with multiple frequency domain (FD)—orthogonal cover code (OCC) patterns using radio resource control (RRC) signaling.

15. The processor of claim 14, further configured to:
   receive downlink control information (DCI), the DCI configured to change a configured FD-OCC pattern from a first FD-OCC pattern to a second different FD-OCC pattern.

16. The processor of claim 14, further configured to:
   receive a medium access control (MAC) control element (CE), the DCI configured to change a configured FD-OCC pattern from a first FD-OCC pattern to a second different FD-OCC pattern.

17. A processor of a user equipment (UE) configured to:
   establish a connection to a fifth generation (5G) new radio (NR) network, wherein the connection is configured to utilize cyclic prefix (CP)—orthogonal frequency division multiplexing (OFDM) waveform and demodulation reference signal (DMRS) type 2;
   receive a DMRS port indication configured to indicate one or more DMRS ports assigned to the UE, wherein single symbol DMRS type 2 is configured to support up to 12 DMRS ports and two symbol DMRS type 2 is configured to support up to 24 DMRS ports;

receive a bitmap for a physical downlink shared channel (PDSCH), wherein a first resource block group (RBG) and a last RBG indicated in the bitmap contain an even number of physical resource blocks (PRBs); and perform a transmission operation or a reception operation using the one or more DMRS ports assigned to the UE.

18. The processor of claim 17, wherein the connection is further configured with a frequency domain (FD)—orthogonal cover code (OCC) length of 4.

19. The processor of claim 18, wherein a physical resource block (PRB) comprises at least a first code division multiplex (CDM) group, a second CDM group and a third CDM group, wherein the first CDM group occupies two sets of 2 consecutive subcarriers of the PRB, wherein the second CDM group occupies two sets of 2 consecutive subcarriers of the PRB, and wherein the third CDM group occupies two sets of 2 consecutive subcarriers of the PRB.

20. The processor of claim 18, wherein a physical resource block (PRB) comprises at least a first code division multiplex (CDM) group, a second CDM group and a third CDM group, wherein the first CDM group occupies a first set of 4 consecutive subcarriers of the PRB, wherein the second CDM group occupies a second set of 4 consecutive subcarriers of the PRB, and wherein the third CDM group occupies a third set of 4 consecutive subcarriers of the PRB.

21. The processor of claim 20, wherein a code division multiplex (CDM) is applied starting from point A common resource block.

* * * * *